United States Patent [19]

Bourdet et al.

[11] Patent Number: 5,759,499

[45] Date of Patent: Jun. 2, 1998

[54] THERMAL REACTOR WITH DIRECT PASSAGE TUBE FOR CURRENT

[75] Inventors: Guy Bourdet, Saint Thibault des Vignes; Alexis Lebris, Coubron, both of France

[73] Assignee: Serthel, Claye-Souilly, France

[21] Appl. No.: 507,497

[22] PCT Filed: Feb. 17, 1994

[86] PCT No.: PCT/FR94/00178

§ 371 Date: Jan. 18, 1996

§ 102(e) Date: Jan. 18, 1996

[87] PCT Pub. No.: WO94/19098

PCT Pub. Date: Sep. 1, 1994

[30] Foreign Application Priority Data

Feb. 24, 1993 [FR] France ................... 93 02101

[51] Int. Cl.[6] ................................................ F28D 7/00
[52] U.S. Cl. ................ 422/199; 422/197; 422/202; 219/59.1; 219/66; 219/67
[58] Field of Search .................... 422/192, 196, 422/197, 199, 239, 285, 307, 312, 202; 219/59.1, 66, 67

[56] References Cited

U.S. PATENT DOCUMENTS

| | | |
|---|---|---|
| 2,235,401 | 3/1941 | Gier, Jr. . |
| 3,782,884 | 1/1974 | Shumaker ................... 431/186 |
| 5,024,818 | 6/1991 | Tibbetts et al. ............ 422/158 |
| 5,560,891 | 10/1996 | Takashima et al. ........... 422/189 |
| 5,573,737 | 11/1996 | Balachandran et al. ....... 422/211 |

FOREIGN PATENT DOCUMENTS

| | | |
|---|---|---|
| 0 439 614 | 8/1991 | European Pat. Off. . |
| 39 29 413 | 3/1991 | Germany . |

OTHER PUBLICATIONS

*Patent Abstracts of Japan* vol. 8, No. 67, Mar. 29, 1984—JP,A,58 219 945 Dec. 21, 1983.

*Primary Examiner*—Christopher Kim
*Attorney, Agent, or Firm*—Scully, Scott, Murphy & Presser

[57] ABSTRACT

A thermal reactor to carry out a chemical reaction under precise and controlled temperature conditions. In a preferred embodiment, the reactor supplies a carbon-laden atmosphere with a predetermined carbon potential to a heat treatment furnace. The reactor has a sealed chamber, in which a chemical reaction is carried out. The chamber forms an electrical resistance element in order to produce within it the reaction temperature conditions. The chamber further being electrically isolated, having an inlet for supplying reaction products, and an outlet for the products coming from the reaction. Temperature measuring thermocouples are positioned on the chamber to determine, accurately and locally, the temperature required for the reaction. Carbon potential is measured by a probe arranged at the chamber's outlet. A microprocessor analyzes the data from the probe and thermocouple and regulates the temperature of the chamber by adjusting the electrical current to the chamber as well as the flow rates of the reaction products into the chamber through mass-flow valves on the inlet.

18 Claims, 1 Drawing Sheet

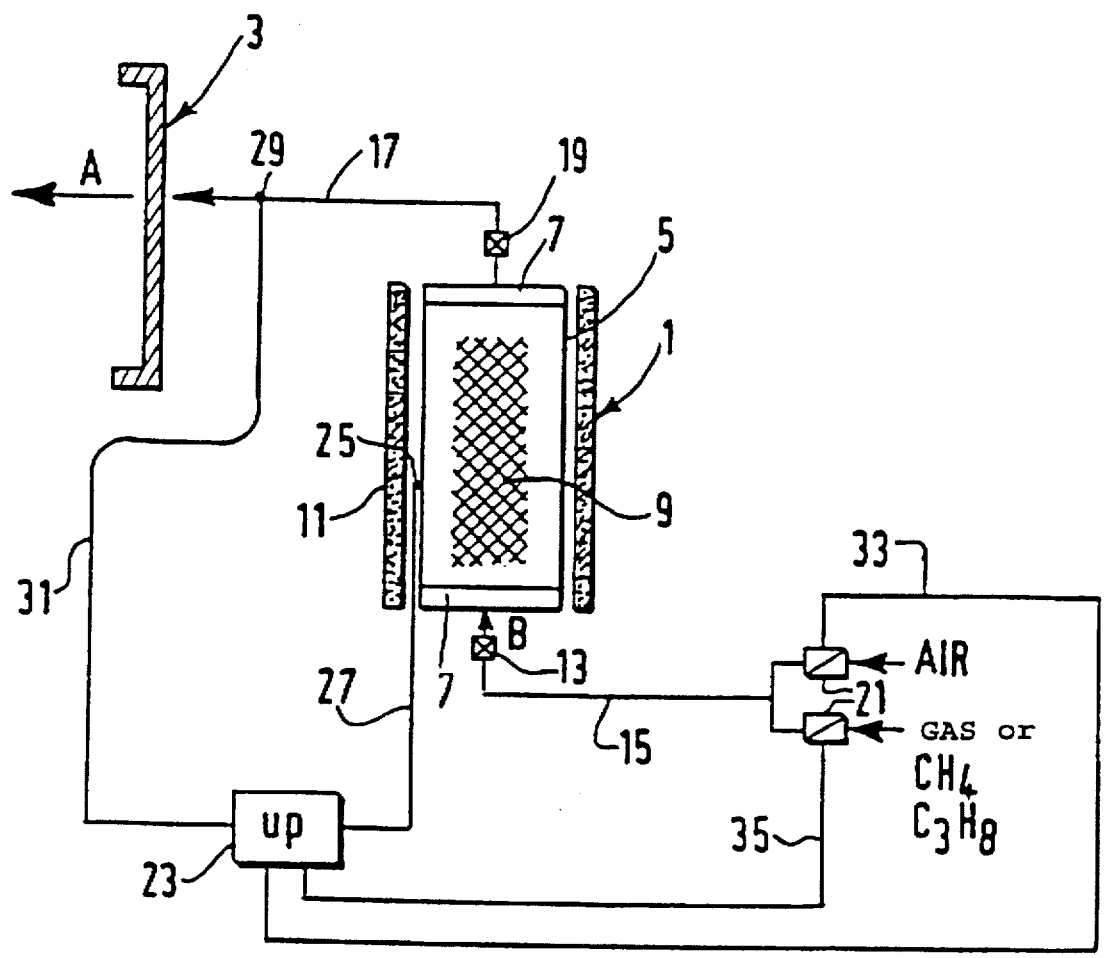

THERMAL REACTOR WITH DIRECT PASSAGE TUBE FOR CURRENT

BACKGROUND OF THE INVENTION

The invention relates to a thermal reactor making it possible to carry out a chemical reaction under precise and controlled temperature conditions, and in particular a thermal reactor delivering a carbon-laden atmosphere with a predetermined carbon potential for the heat treatment of metal parts (hardening, carbonitriding or carburizing) in suitable furnaces.

SUMMARY OF THE INVENTION

Such reactors, which generate a carbon-laden atmosphere in heat treatment furnaces, are known. These reactors crack, at a predetermined temperature, an incoming gas mixture obtained from a mixture of air and of methane or propane, in variable proportions, into a carbon-laden gas mixture and especially into carbon monoxide (CO) and hydrogen ($H_2$) constituting said carbon-containing atmosphere. These reactors use a sealed chamber forming a reactor or a horn heated externally to the desired temperature and the carbon-rich outlet gas mixture of which is cooled (quenching reaction) before reaching the heat treatment furnace. These reactors require a relatively bulky installation which is difficult to control and relatively expensive in terms of energy because of the external heat losses due to the heating chamber of the reactor and also because of the need to reheat the gases produced, these being quenched on introducing them into the furnace.

A reactor is known, from EP-A-0,439,614, which consists of a sealed chamber heated by internal electrical resistance elements. However, the resistance elements corrode extensively with the passage of the gaseous reactive flux and disturb the reaction, relative to that of the catalyst. Furthermore, by reason of the large and radially non-uniform temperature gradient between the resistance elements and the catalyst, complete control of the temperature of the catalyst, and therefore of the reaction, is difficult. Finally, the connection of the resistance elements to the electrical power supply requires a complex and expensive manufacture.

The invention aims to remedy these drawbacks by providing a thermal reactor comprising a chamber in which a chemical reaction is carried out under predetermined temperature conditions, characterized in that said chamber consists of a tube made of refractory metallic material forming an electrical resistance element by direct passage of the current in the tube, whose volume and material are compatible with the application, suitably supplied via its connection terminals with (low voltage) current depending on its electrical resistance in order to produce within it said reaction temperature conditions, said tube being mounted in a sealed manner, said chamber being electrically isolated and having means for supplying reaction products and means for the outlet of the products coming from the reaction.

Of course, the tube may contain a catalyst suitable for the envisaged application and, for example, a refractory catalyst based on nickel oxide, this being conventional for the production of a carbon-laden atmosphere in heat treatment furnaces.

Said tube with passage of current is a tube made from rolled, welded or centrifugally cast sheet, made of heat-resistant (refractory) metal alloy and consequently easy to manufacture and inexpensive.

Temperature-measuring thermocouples are positioned along the length of the tube so as to determine, accurately and locally, the temperature level required for the reaction. The temperature level may be set to a variable level and easily controlled by varying the electrical supply of the current generator of the tube.

The tube is advantageously encased in an insulating jacket limiting the external heat losses, these external heat losses being minimal because of the small size of the whole reactor. Possibly, a passage for a cooling or temperature-homogenizing gas (air) flow may be formed between the wall of the tube and the insulating jacket. The flow rate of the flow may be regulated to a temperature set point, by means of a controlled fan.

Of course, the reactor may be arranged outside the furnace or laboratory receiving the reaction products, a lagged outlet pipe connecting the tube to the furnace, but it may also be arranged inside the latter, thus contributing directly to its heating. It may be mounted in a position having any direction (vertical or horizontal).

The invention is explained below with the aid of an embodiment and with reference to the appended drawing, in which:

BRIEF DESCRIPTION OF THE DRAWING

FIG. 1 is a diagram of a reactor in accordance with the invention.

DETAILED DESCRIPTION OF THE PREFERRED EMBODIMENTS

The reactor 1 shown is intended to supply a heat treatment furnace 3 with a carbon-rich gas or atmosphere (in the direction of the arrow A). It comprises a reaction chamber (5) proper towards which is conveyed at the lower level (from the direction of the arrow B) a gas mixture consisting of air and of methane or propane in a variable proportion. The carbon-rich atmosphere containing in particular the gases (CO and $H_2$) leaves at the upper level and goes as far as the furnace. The chamber consists of a tube with direct passage of current, which tube is supplied via its connection terminals 7 at its ends by means of a current generator, not shown. This tube is made using known technology, consisting of a rolled and welded, or possibly centrifugally cast, sheet made of refractory steel based on nickel-chromium alloy. It easily withstands the temperatures (less than 1100°) required for cracking the inlet gases decomposed into hydrogen, nitrogen, carbon monoxide, and carbon dioxide, water vapour and methane (in low quantities), according to the aforementioned proportion of air and of methane or propane in the inlet gases. This tube may have a diameter of the order of 100 mm and a length of 1500 mm. It contains a refractory catalyst 9 based on nickel oxide accelerating the reaction.

A low-voltage high-density current, of the order of 1000 to 3000 A for example, flows through the tube. The tube is thermally insulated by an external lagging jacket 11. A seal 13 electrically isolates the pipe 15 for letting the gas mixture into the reactor. Likewise, the pipe 17 for the carbon-containing atmosphere is isolated by a similar seal 19. The aforementioned inlet pipe is connected in parallel to two branches supplied respectively with air and with $CH_4$ or $C_3H_8$ gas. The final mixture formed from the air and the $CH_4$ or $C_3H_8$ gas is effected with variable proportions, these being controlled by means of two mass-flow valves 21 on each of the aforementioned branches.

The reactor is operated under the control of a control unit, for example a microprocessor 23 connected via various relationships to the reactor tube and managing its supply members. The various relationships consist of the reactor input parameters, air and $CH_4$ or $C_3H_8$ gas proportions, determined by the mass-flow valves 21, reaction parameters (temperature and catalyst) and output parameters: carbon-potential set values determined by the proportions of CO, $CO_2$, $CH_4$ and $H_2O$ in the atmosphere produced by the reactor and required for the heat treatment in the furnace. Thus, a thermocouple 25, applied against the wall of the tube and connected at 27 to the microprocessor, gives information regarding the temperature. The carbon potential is monitored by means of a probe 29 arranged at the outlet of the pipe conveying the carbon-containing atmosphere to the furnace and possibly by means of another probe (not shown) arranged inside the furnace or laboratory receiving reaction products. The corresponding signal from the probe or probes is sent to the microprocessor by means of a link 31. The inlet valves 21 are connected, under set control, to the microprocessor by means of the links 33 and 35. The microprocessor, depending on the aforementioned set values, regulates the temperature of the reactor by setting the supply of the generator (not shown) of the tube to an appropriate level; likewise, it sets the flow rates of the aforementioned mass-flow valves, as well as the proportion, at the inlet, of $CH_4$ or $C_3H_8$ gas.

The microprocessor will also be able to initiate the burning-off of the soot, at relatively closely-spaced intervals, in order to prevent excessive deposition and therefore an excessive burning temperature, with simultaneous monitoring of the temperature, alleviating any damage to the tube caused by overheating. Of course, other reactor safety parameters, not specific to the technology of the tube but related to the operation of the furnace, may also be taken into account, such as the management of a safety nitrogen feed for the furnace depending on the faults observed.

We claim:

1. A thermal reactor comprising a chamber in which a chemical reaction is carried out under predetermined reaction temperature conditions, wherein said chamber comprises a tube made of refractory metallic material forming an electrical resistance element by direct passage of current through the tube, and having an inlet means for supplying products to be reacted and an outlet means for releasing the products resulting from the reaction, the tube further having a volume and being of a material compatible with the application, the tube further being suitably supplied via connection terminals disposed on the tube with current depending on the electrical resistance of the tube in order to produce within the tube said reaction temperature conditions, said tube being mounted in a sealed manner, said chamber further being electrically isolated at the inlet and outlet means.

2. The thermal reactor as claimed in claim 1, further comprising a catalyst for catalyzing the reaction.

3. The thermal reactor as claimed in claim 1, wherein said tube with passage of current is a tube made from a heat-resistant refractory metal alloy sheet.

4. The thermal reactor as claimed in claim 1, wherein temperature measuring thermocouples are positioned along the length of the tube so as to determine, accurately and locally, the temperature level required for the reaction, the temperature level being set to a variable level and controlled by varying the electrical supply of the tube.

5. The thermal reactor as claimed in claim 1, wherein the tube is encased in a thermally insulating jacket such that a passage for a cooling or temperature-homogenizing gas flow is formed between a wall of the tube and the insulating jacket.

6. The thermal reactor as claimed in claim 1, wherein the thermal reactor is arranged inside or outside a treatment furnace or laboratory receiving the reaction products, and is mounted in any direction.

7. The thermal reactor as claimed in claim 1, wherein the reaction is controlled in operation to a variable level by a control unit which, depending on set values which are required for a carbon-containing atmosphere are determined by at least one measurement probe for measuring the temperature level within the tube, the temperature measurements being relayed to the control unit via electrical links, the control unit regulating the temperature by controlling the supply of current to the tube, the supply of reaction products to the chamber via the inlet means, and/or the release of the products coming from the chamber via the outlet means.

8. The thermal reactor as claimed in claim 1, wherein the voltage supplying the current is less than 50 volts.

9. The thermal reactor as claimed in claim 2, wherein the catalyst is a refractory catalyst based on nickel oxide.

10. The thermal reactor as claimed in claim 3, wherein the sheet is rolled and welded.

11. The thermal reactor as claimed in claim 3, wherein the sheet is centrifugally cast.

12. The thermal reactor as claimed in claim 6, wherein the thermal reactor is mounted in a vertical direction.

13. The thermal reactor as claimed in claim 6, wherein the thermal reactor is mounted in a horizontal direction.

14. The thermal reactor as claimed in claim 7, wherein the probe is a thermocouple.

15. The thermal reactor as claimed in claim 7, wherein the control unit supplies reaction products via the inlet means for maintenance of the chamber.

16. The thermal reactor as claimed in claim 15, wherein the control unit regulates a supply of air and a gas selected from the group consisting of methane and propane for burning off soot accumulated in the chamber.

17. The thermal reactor as claimed in claim 7, wherein the control unit supplies reaction products via the inlet means for safely terminating the reaction.

18. The thermal reactor as claimed in claim 17, wherein the reaction is terminated by supplying nitrogen for extinguishing the reaction in the event of a fault or overheating.

* * * * *